United States Patent
Carditello (10) Patent No.: US 12,036,864 B2
(45) Date of Patent: Jul. 16, 2024

(54) CONTROL KNOB FOR A MOTOR VEHICLE

(71) Applicant: FERRARI S.P.A., Modena (IT)

(72) Inventor: Tommaso Carditello, Modena (IT)

(73) Assignee: FERRARI S.P.A., Modena (IT)

(*) Notice: Subject to any disclaimer, the term of this patent is extended or adjusted under 35 U.S.C. 154(b) by 0 days.

(21) Appl. No.: 18/302,047

(22) Filed: Apr. 18, 2023

(65) Prior Publication Data

US 2023/0339325 A1    Oct. 26, 2023

(30) Foreign Application Priority Data

Apr. 21, 2022    (IT) ..................... 102022000007877

(51) Int. Cl.
    *B60K 35/00*       (2024.01)
    *B60H 1/00*        (2006.01)
    (Continued)

(52) U.S. Cl.
    CPC ........... *B60K 35/00* (2013.01); *B60H 1/0065* (2013.01); *B60K 35/10* (2024.01); *B60K 35/60* (2024.01);
    (Continued)

(58) Field of Classification Search
    CPC ...... B60K 2360/1434; B60K 2360/695; B60K 35/10
    See application file for complete search history.

(56) References Cited

U.S. PATENT DOCUMENTS 4,038,508 A    7/1977    Mapelsden
8,573,092 B2   11/2013   Kramlich
(Continued)

FOREIGN PATENT DOCUMENTS

JP           4709081 B2      6/2011
WO    2008129974 A1   10/2008

OTHER PUBLICATIONS

Italian Search Report for Application No. 102022000007877; Filing Date: Apr. 21, 2022; Date of Mailing—Dec. 6, 2022, 12 pages.

*Primary Examiner* — Vicky A Johnson
(74) *Attorney, Agent, or Firm* — CANTOR COLBURN LLP (57) ABSTRACT

A control knob for a motor vehicle is described, the former comprising a rotor that can rotate around an axis; a fixed body; a member; and an actuator selectively movable between a first configuration, in which it allows said rotor and said member to rotate relative to the body around the axis, and a second configuration, in which it exerts a braking torque upon the member; a first element and a second element interacting with one another, in a snapping manner, in a plurality of consecutive positions, when the actuator is arranged in the first configuration, so as to provide a first touch-related feedback; the knob comprises a third element, a profile extending crosswise to the third element; and a fourth elastic element connecting the third element and the profile to said rotor; the third element, the fourth elastic element and the profile can rotate together with the rotor and the member in an integral manner, when the actuator is arranged in the first configuration; the third element slides on the profile to provide a single second touch-related feedback, when the actuator is arranged in said second configuration.

11 Claims, 8 Drawing Sheets

(51) Int. Cl.
*B60K 35/10* (2024.01)
*B60K 35/60* (2024.01)
*B60N 2/02* (2006.01)

(52) U.S. Cl.
CPC .................. *B60K 2360/126* (2024.01); *B60K 2360/1434* (2024.01); *B60K 2360/695* (2024.01); *B60K 2360/774* (2024.01); *B60N 2/0228* (2013.01)

(56) References Cited

U.S. PATENT DOCUMENTS

| | | |
|---|---|---|
| 10,705,616 B2 * | 7/2020 | Bagley .................. H02K 11/21 |
| 11,181,993 B2 * | 11/2021 | Nishimoto ............ G06F 3/0362 |
| 2008/0202906 A1 | 8/2008 | Schelbert |
| 2012/0262393 A1 | 10/2012 | Yokoyama et al. |
| 2018/0239385 A1 * | 8/2018 | Mizukami ............. F16D 65/186 |
| 2020/0101845 A1 | 4/2020 | Baek |

* cited by examiner

CONTROL KNOB FOR A MOTOR VEHICLE

CROSS-REFERENCE TO RELATED APPLICATIONS

This patent application claims priority from Italian Patent Application no. 102022000007877 filed on Apr. 21, 2022, the entire disclosure of which is incorporated herein by reference.

TECHNICAL FIELD

The present invention relates to a control knob for a motor vehicle.

BACKGROUND

As is known, motor vehicles comprise:
a plurality of on-board systems which can be adjusted by the user and are designed to control the comfort within a passenger compartment of the motor vehicle itself; and
one or more control knobs for operating and adjusting the above systems.

Typical examples of said systems are a control system of an air conditioning system for adjusting the cooling air flow rate and the temperature in the passenger compartment of the motor vehicle, or a system for adjusting the inflation pressure of the motor vehicle seats.

As is known, the above systems can be systems that can be adjusted according to a closed-loop control logic, such as for example the above-mentioned air conditioning system.

In this case, the system comprises an actuator controlled by the knob and a sensor that detects that the desired condition has been reached and controls the actuator in feedback.

Alternatively, as is known, the above systems can be adjustable according to an open-loop control logic, such as for example the above-mentioned inflation system.

In this case, the system is sensorless and the actuator is controlled by the knob without any feedback.

Control knobs are known which substantially comprise a fixed support in relation to the passenger compartment and a rotor that can rotate around the fixed support so as to assume a plurality of angular positions corresponding to respective adjustment positions of the system.

These well-known knobs control a single system that can be adjusted according to a closed-loop control logic or according to an open-loop control logic.

There is a need in the field to be able to control both systems that can be adjusted according to a closed-loop control logic and systems that can be adjusted according to an open-loop control logic with a single knob, so as to reduce overall dimensions and facilitate the adjustment of the aforementioned systems, thereby reducing the risk of user distraction. This is in order to simplify comfort control within the passenger compartment.

There is also a need in the field to adjust these systems in a precise way, providing the user with different touch-related feedbacks that are immediately distinguishable by the user.

JP-B-4709081 describes a well-known control knob for a motor vehicle according to the preamble of claim 1.

SUMMARY

The object of the present invention is to provide a control knob for a motor vehicle, which allows at least one of the above-mentioned requirements to be met.

Said object is achieved by the present invention, insofar as it relates to a control knob for a motor vehicle as defined in claim 1.

BRIEF DESCRIPTION OF THE DRAWINGS

For a better understanding of the present invention, a preferred embodiment is described by way of non-limiting example and with reference to the accompanying drawings, wherein.

DESCRIPTION OF EMBODIMENTS

Figure 4:
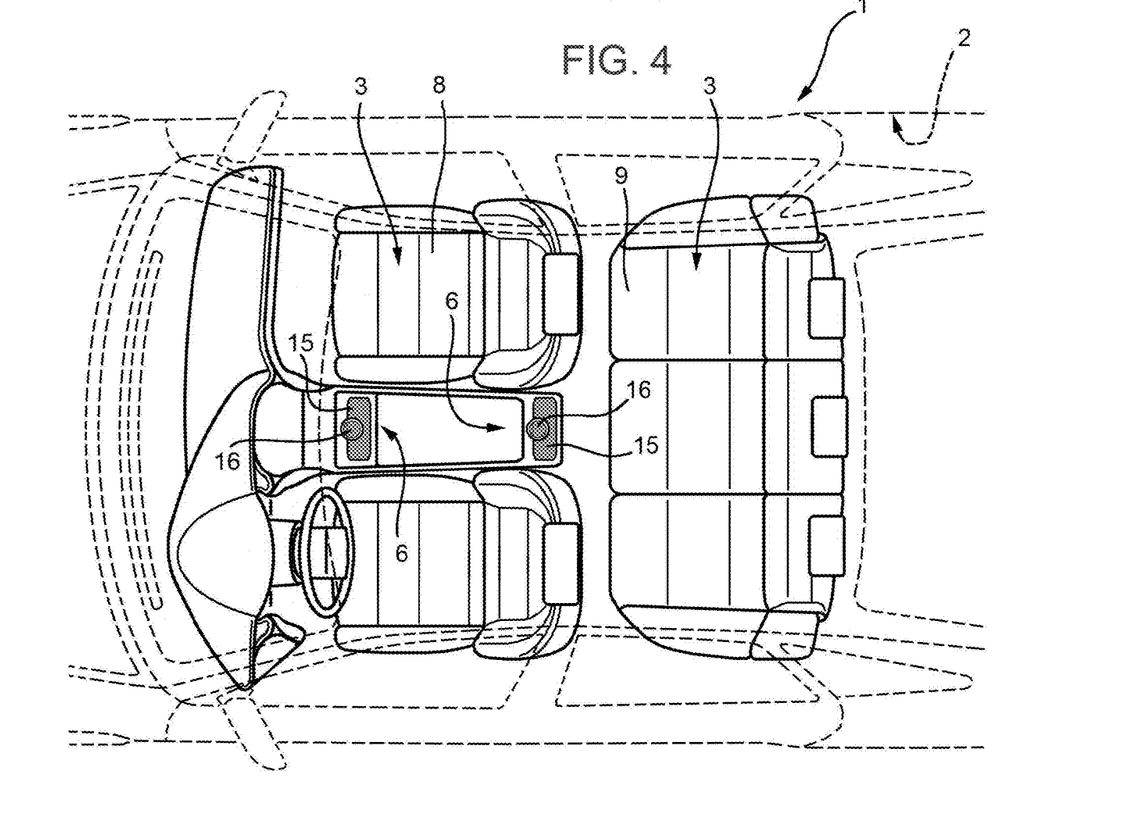
FIG. 4 is a top view of a passenger compartment of a motor vehicle, within which the interface in FIG. 3 is installed.

With reference to FIG. 4, the numeral 1 indicates a motor vehicle only showing a passenger compartment 2 and a plurality of seats 3 in the passenger compartment 2.

It should be noted that in the remainder of the present description, terms such as "above", "below", "front", "rear" and the like are used with reference to the condition of normal forward movement of the motor vehicle 1.

The motor vehicle 1 comprises, in particular:
a front area 8 accommodating a pair of front seats 3; and
a rear area 9 accommodating a pair of rear seats 3.

The motor vehicle 1 further comprises (FIG. 15):
a plurality of on-board systems 4, 5 designed to control the comfort on board the motor vehicle 1;
a plurality of control interfaces 6 of the aforementioned systems 4, 5 which can be operated by the user to enter suitable commands; and
a control unit 7 programmed to control the systems 4, 5 based on the commands entered by the user on the interfaces 6.

Figure 15:
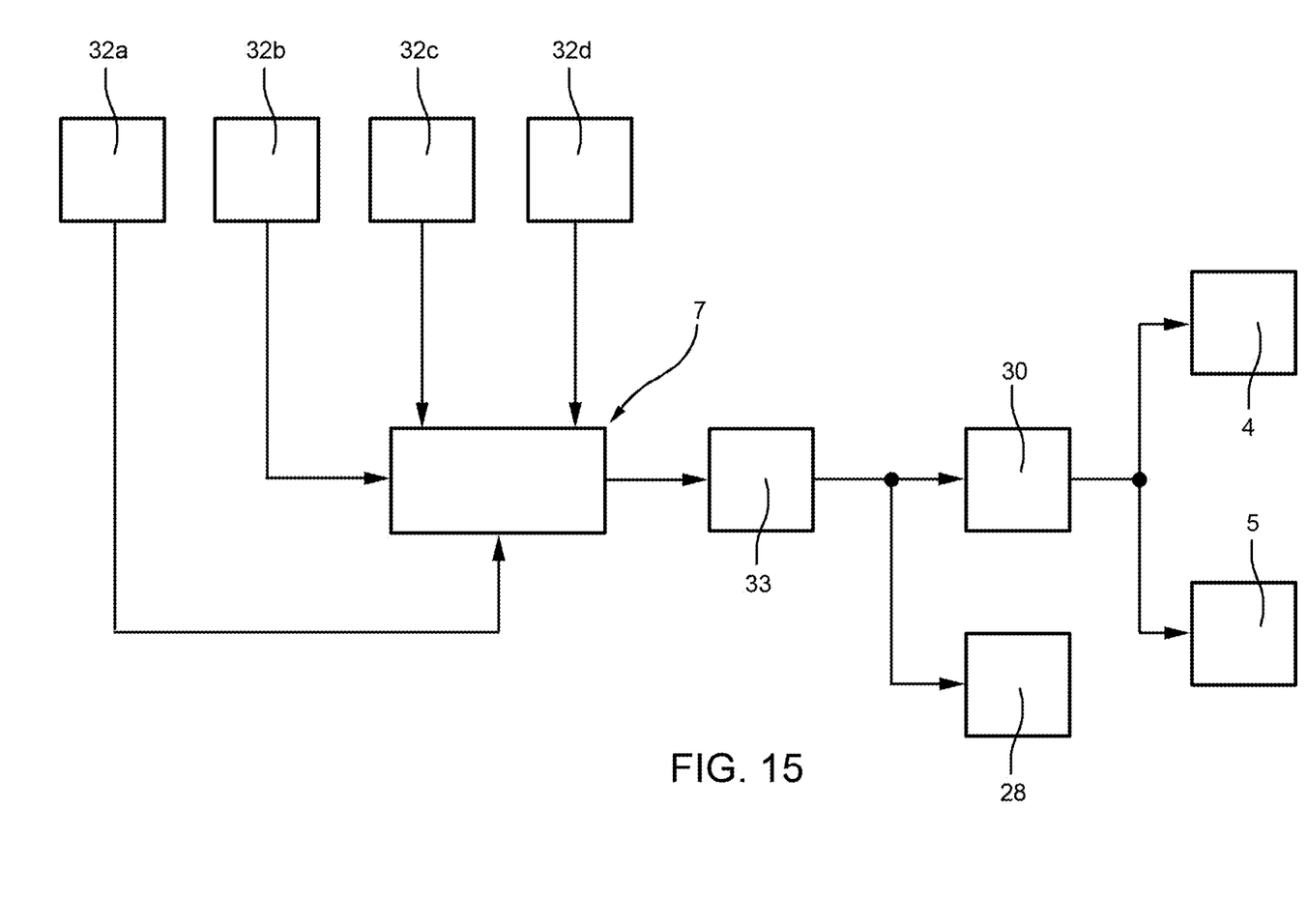
FIG. 15 is a functional diagram of further components of the motor vehicle in FIG. 4.

Non-limiting examples of the systems 4, 5 are an air conditioning system 4 designed to adjust the temperature inside the passenger compartment 2 and a system 5 designed to adjust the inflation pressure of the seats 3.

Further examples of the systems 4, 5 are a system for controlling the temperature of the seats 3, a system for activating an electro-chromic roof, or a system for controlling the massage function of the seats 3.

In the case illustrated herein, the motor vehicle 1, for each area 8, 9, comprises:
- a related system 4;
- a related system 5; and
- a related interface 6.

In the remainder of the present description, only one system 4, one system 5 and one interface 6 are described, the systems 4, 5 and the interfaces 6 being identical to each other.

In the case illustrated herein, the system 4 is a closed-loop control system, i.e., as is known, it comprises:
- an actuator (not shown) controlled by the interface 6; and
- a sensor (also not shown) designed to detect the temperature and/or humidity and/or air flow rate supplied by the system 4 into the passenger compartment 2 and to control the actuator in feedback mode so that the actuator is stopped when the temperature and/or humidity values set by the interface 6 are reached.

In the case illustrated herein, the system 5 is an open-loop control system, i.e., as is known, it comprises a second actuator controlled by the interface 6 and not controlled in feedback mode.

The interface 6, in turn, comprises (FIG. 3):
- a surface 15 defining a plurality of control areas 17a, 17b, which can be activated by touch to control the adjustment of the respective systems 4, 5; and
- a knob 16.

Figure 3:
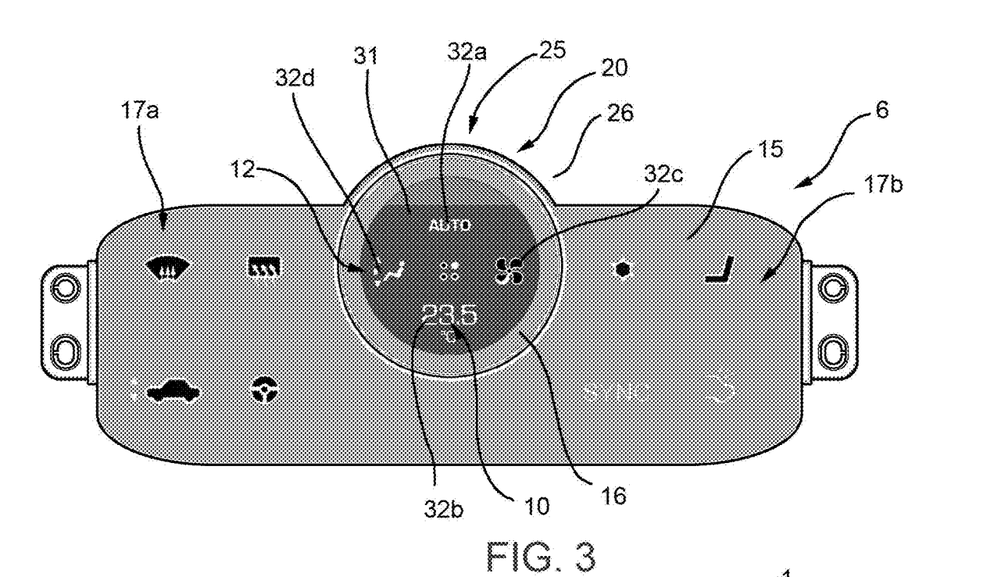
FIG. 3 is a top view of a control interface of the motor vehicle comprising the knob in FIGS. 1 and 2.

In greater detail, the knob 16 comprises:
- a support 20 fixed to a fixed structure of the passenger compartment 2; and
- a rotor 25 supported by the support 20, which can be grabbed by the user and is designed to receive a command to rotate around an axis A.

Advantageously, the knob 16, in turn, comprises:
- a body 80 mounted in a movable way in relation to the support 20 and the rotor 25;
- an actuator 30 selectively movable between a first configuration, in which it allows the body 80 and the rotor 25 to rotate around the axis A, and a second configuration, in which it exerts a braking torque upon the body 80, so as to allow a relative rotation between the rotor 25 and the body 80;
- a pair of springs 49 interposed between the rotor 25 and the support 20; and
- a toothing 50 carried by the support 20;
- the springs 49 and the toothing 50 sequentially interact with one another, in a snapping manner, in a plurality of consecutive positions, when the actuator 30 is arranged in said first configuration, so as to provide said user with a first touch-related feedback formed by a sequence of snaps, each having a first stroke C1;
- the knob 16 further comprises:
- a plurality of pins 60 and respective profiles 62 transversal to the corresponding pins 60; and
- a plurality of springs 61, each designed to elastically connect a respective pin 60 and the rotor 25;
- the pins 60 and the respective springs 61 and profiles 62 can rotate around the axis A integrally with each other and with the rotor 25 and the body 80, when the actuator 30 is arranged in the first configuration;
- the pins 60 can slide on the respective profiles 62 so as to provide the user with a single touch-related feedback of the continuous type and according to a stroke C2, when the actuator 30 is arranged in the second configuration.

The knob 16 further comprises:
- a casing 26 fixed to the structure of the motor vehicle 1 and in relation to which an assembly 27 consisting of the rotor 25 and the support 20 is mounted in a sliding manner relative to the axis A; and
- an actuator 28 selectively operable to allow the assembly 27 to move along the axis A in relation to the casing 26.

Figure 1:
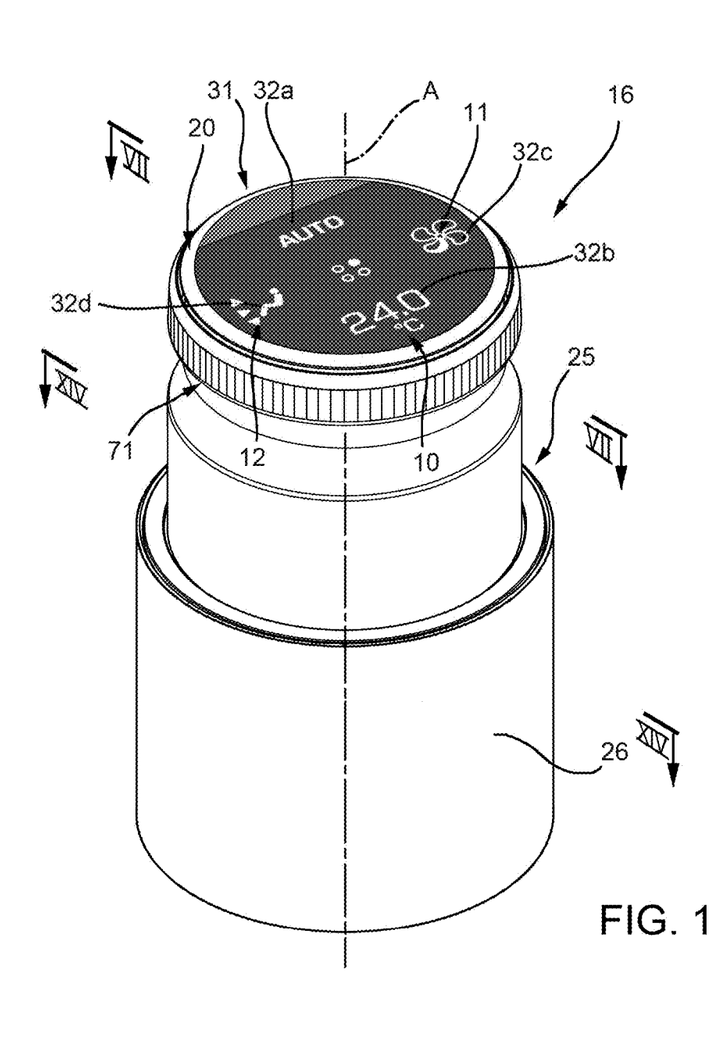
FIG. 1 is a perspective view of a control knob made according to the present invention in an extracted position.
Figure 2:
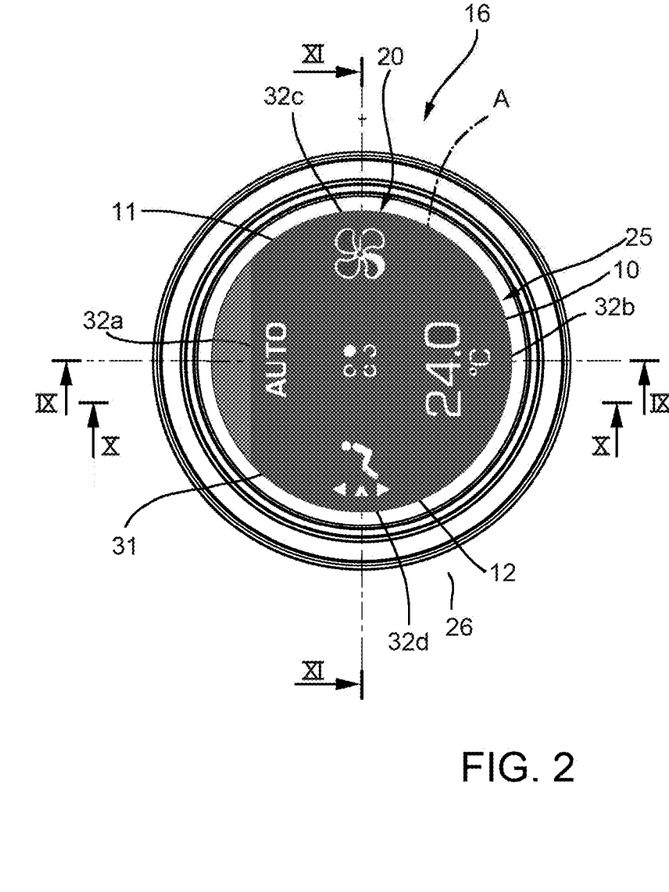
FIG. 2 is a top view of the knob in FIG. 1.
Figure 5:
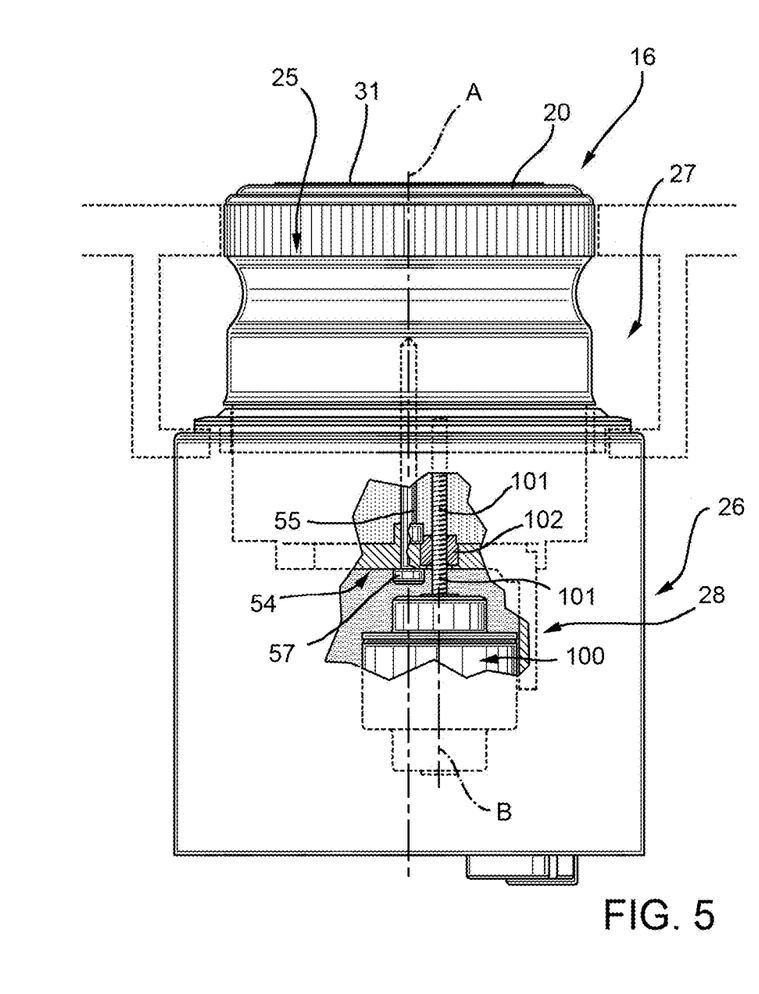
FIGS. 5 and 6 are front views of the knob in FIGS. 1 to 4, in the retracted position of FIG. 4 and in the extracted position of FIG. 3, respectively.
Figure 6:
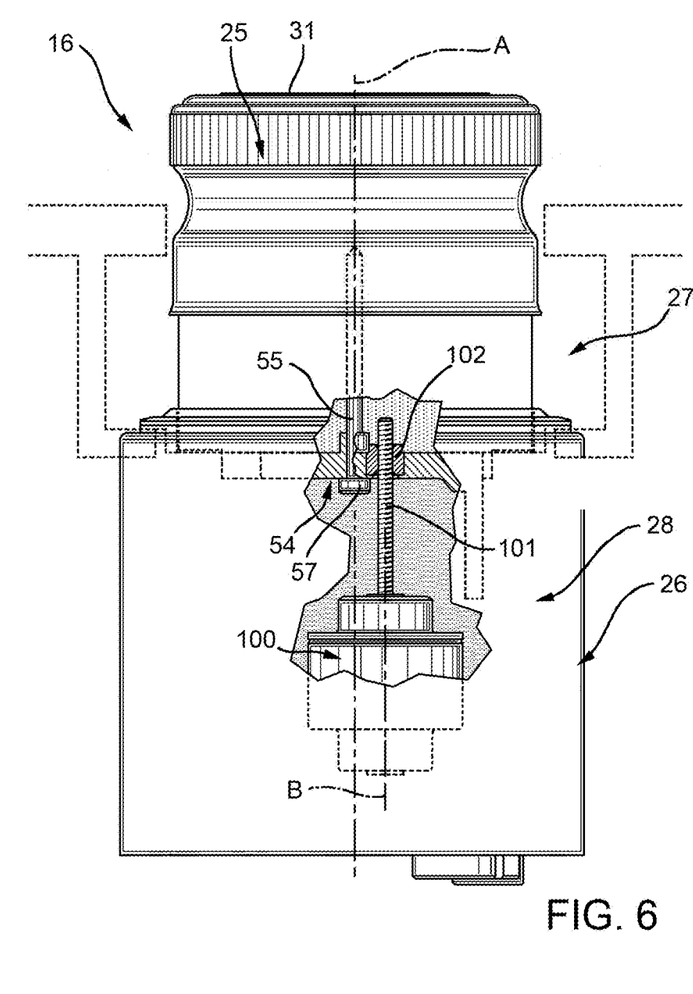

In greater detail, the assembly 27 can slide in relation to the casing 26 between:
- a lifted operative position (FIGS. 1 and 6) in which it protrudes axially from the surface 15; and
- a lowered rest position (FIG. 5) in which an area 31 is just above the level of the surface 15.

The knob 16 further comprises (FIGS. 9 to 11):
- the area 31 with a control area 32a which can be activated by touch to activate the sliding of the assembly 27 from the lifted position to the lowered position, and vice versa; a pair of areas 32b, 32c which can be activated by touch to control the system 4; and an area 32d which can be activated by touch to control the system 5; and
- a printed circuit board 33 operatively connected to the control unit 7.

In greater detail and with reference to FIG. 3, the activation of the area 32b opens a menu 10 that allows the temperature within the area 8, 9 to be adjusted.

The activation of the area 32c opens a menu 11 that allows the heating/cooling air flow rate within the area 8, 9 to be adjusted.

The activation of the area 32d opens a menu 12 that allows the selection of different regions (top, middle, bottom) of the seat 3 whose inflation pressure is adjusted.

The printed circuit board 33 is configured to:
- move the knob 16 from the lowered position to the activated position, and vice versa, following the activation of the area 32a; and
- arrange the actuator 30 in the first configuration when one of the areas 17a, 32b, 32c is activated, or in the second configuration when one of the areas 17b, 32d is activated.

In this way, the actuator 30 is arranged in the first configuration when activation of the closed-loop control system 4 is required. The actuator 30 is arranged in the second configuration when activation of the open-loop control system 5 is required.

The support 20 extends along the axis A and is housed coaxially within the rotor 25.

In greater detail, the support 20 comprises (FIGS. 7 to 12):
- a body 35 defining the area 31;
- the toothing 50 integrally connected to the body 35 around the axis A by means of a pin; and
- a cup-shaped tubular element 37.

The body 35, in turn, comprises:
- an axial end surface 40 protruding axially from the rotor 25, lying in a plane orthogonal to the axis A, and defining the area 31;
- a surface 41 axially opposite the surface 40, annular and lying in a plane orthogonal to the axis A; and
- a lateral surface 42 extending between the surfaces 40, 41 and housed with radial clearance inside the rotor 25.

The surfaces 40, 42, 41 have a progressively decreasing radial size.

In particular, the surface 40 is circular and the area 32a is shaped like a crescent protruding from the surface 40.

The body 35 further comprises:
- a ring 45 lying in a plane orthogonal to the axis A and axially spaced from the surface 42; and a pair of appendages 46 protruding cantilevered parallel to the axis A from the surface 42 and extending up to the ring 45.

The toothing 50 comprises, in turn, a plurality of teeth 51 angularly equally spaced and protruding cantilevered on the side opposite the axis A.

The support 20 further comprises (FIGS. 10 and 11):
a rod 49 fixed to the toothing 50 and to the body 35 so as to connect them to each other;
a body 54 arranged on the axially opposite side of the element 37 relative to the body 35 and eccentric to the axis A; and
a rod 55 which is coaxial with the axis A and ends with a grooved profile 56 engaging a seat 52 of the toothing 50 and passing through the element 37 with clearance.

The element 37 has a decreasing radial size starting, parallel to the axis A, from the toothing 50 on the side opposite the body 35.

Figure 10:
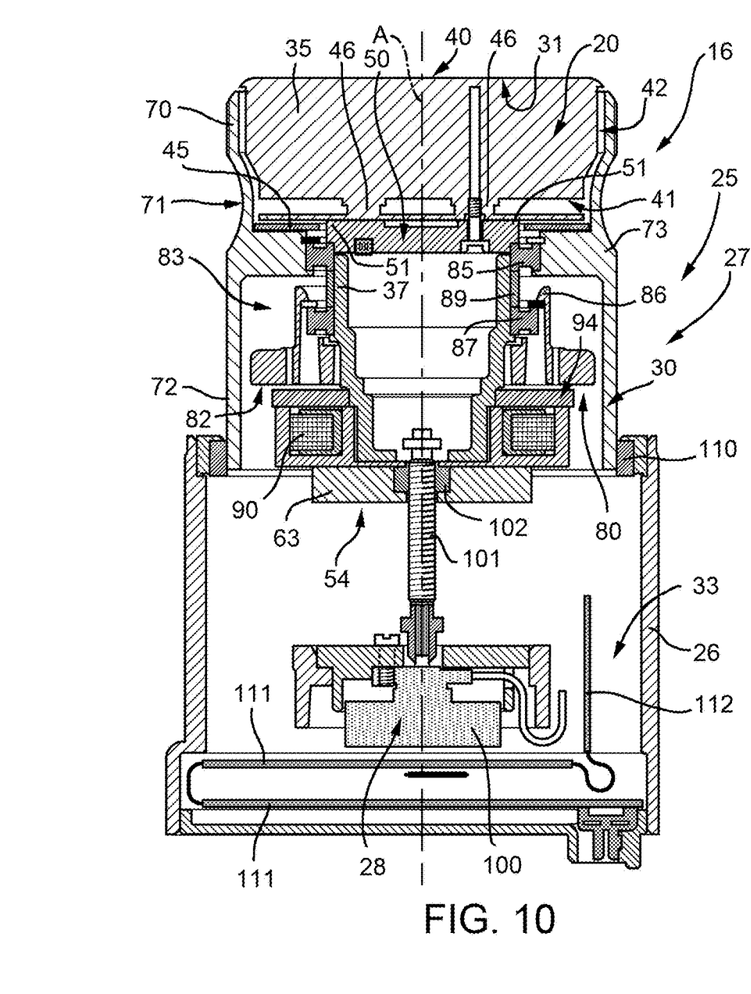
FIG. 10 is a section along the line X-X in FIG. 2.
Figure 11:
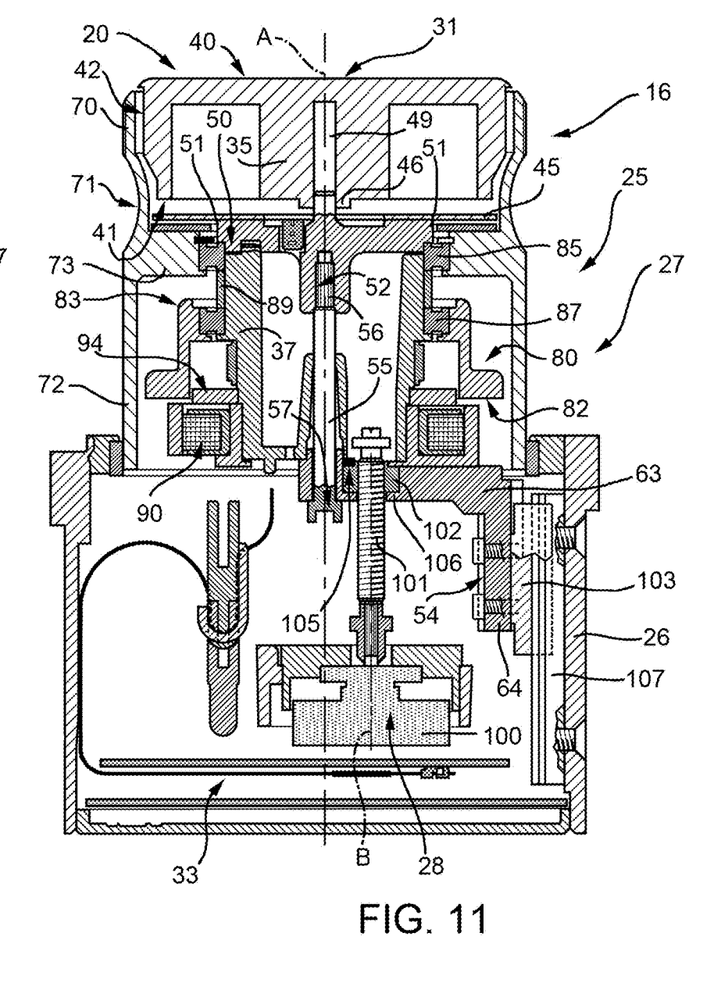
FIG. 11 is a section along the line XI-XI in FIG. 2.

With particular reference to FIGS. 10 and 11, the body 54, in turn, comprises:
a crosspiece 63 lying in a plane orthogonal to the axis A and extending eccentrically to the axis A; and
a crosspiece 64 protruding cantilevered from a radial end of the crosspiece 63 in the axial direction and on the side axially opposite the body 35, and lying in a plane orthogonal to the plane in which the crosspiece 64 lies eccentrically to the axis A.

With reference to FIG. 11, the rod 55 ends, on the side axially opposite the toothing 50, with an annular shoulder 57 arranged axially in contact with the crosspiece 63 of the body 54.

The rotor 25, in turn, is tubular and comprises (FIGS. 9 to 11):
an axial end segment 70 housing the body 35;
an axial end segment 72 axially opposite to the segment 70; and
a segment 73 axially interposed between the segments 70, 72 and surrounding the toothing 50 and defining a knurled annular concavity 71 to facilitate the user's grip.

The segments 70, 72 are axially open.

Figure 7:
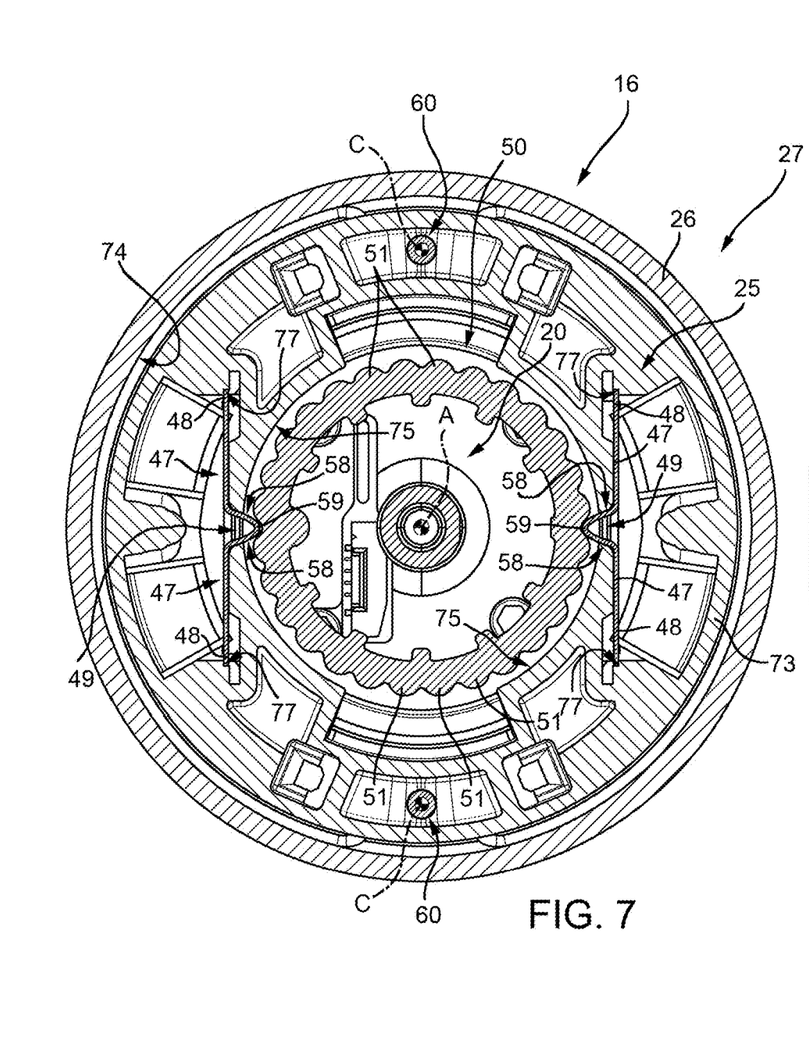
FIG. 7 is a further enlarged scale section along the line VII-VII of FIG. 1 showing first components of the knob in FIGS. 1 to 6.
Figure 8:
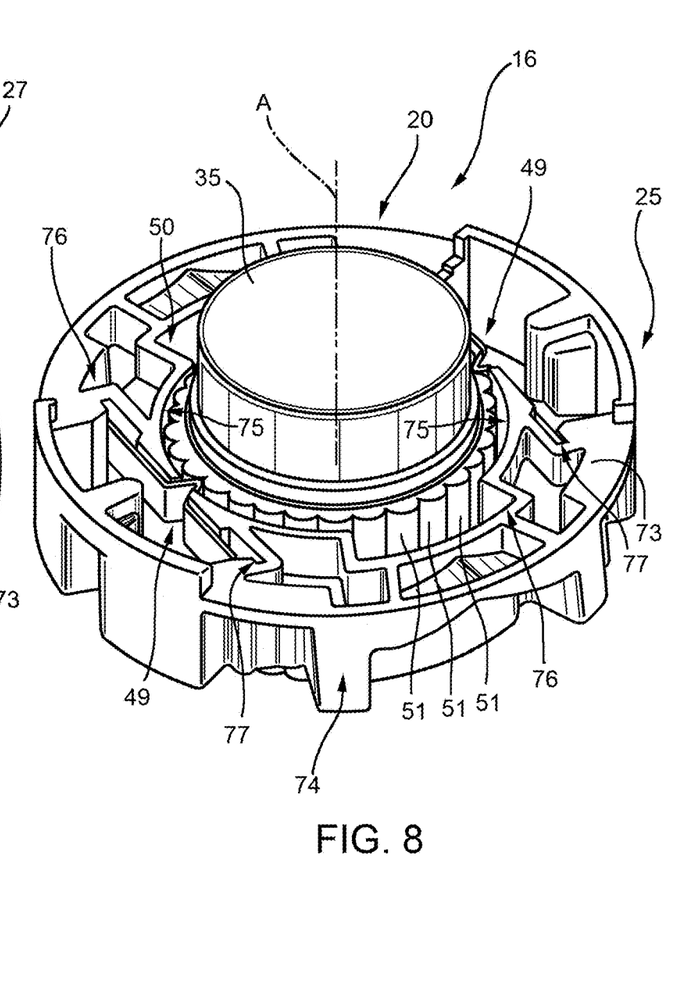
FIG. 8 is a perspective view of the first components in FIG. 7, with parts removed for clarity.

With reference to FIGS. 7 and 8, the segment 73, in turn, comprises:
a radially external annular wall 74 contiguous with the segments 70, 72;
a pair of arc-shaped walls 75 radially interposed at a distance between the wall 74 and the toothing 50; and
a pair of structures 76 radially interposed between the wall 74 and the walls 75, each defining a pair of seats 77 for fixing respective springs 49.

Each spring 49 is radially interposed between the toothing 50 and the related structure 76 of the rotor 25 (FIGS. 7 and 8).

Each spring 49 sequentially co-operates with the teeth 51 of the toothing 50 by deforming elastically. Consequently, each spring 49 exerts on the rotor 25 a resistive elastic load proportional to the deformation of the spring 49.

The extent of the stroke C1 substantially corresponds to the elastic deformation of the spring 49 and therefore to the radial size of the teeth 51.

In the case illustrated herein, there are two springs 49 arranged symmetrically relative to the axis A.

Each spring 49 essentially comprises:
a pair of segments 47 fixed at their free opposite ends 48 to respective seats 77; and
a pair of segments 58 converging into a vertex 59 sequentially cooperating with the teeth 51 and bent starting from the segments 47 towards the vertex 59.

In the case illustrated herein, each spring 49 is a leaf spring.

Figures 9, 12:
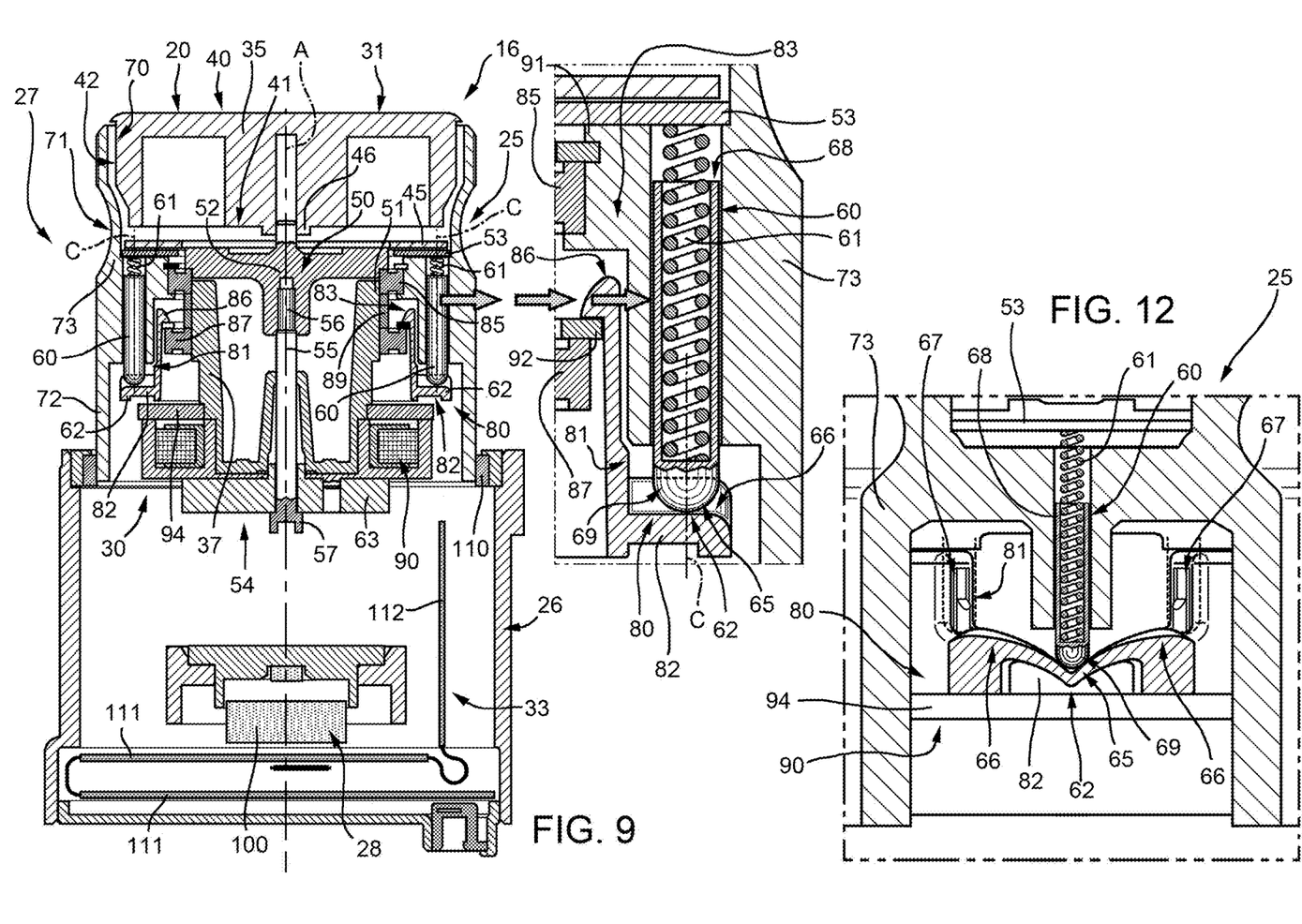
FIG. 9 is a section along the line IX-IX of FIG. 2 showing second components of the knob in FIGS. 1 to 8.
FIG. 12 is a particularly enlarged view of some details in FIG. 9.

With reference to FIGS. 9 and 12, the segment 72 also defines the seats 62.

In particular, the seats 62 are angularly equally spaced and house respective pins 60 and springs 61.

In the case illustrated herein, there are two pins 60, two springs 61, and two seats 62.

Each pin 60, in turn, comprises an annular end 68 and a semi-spherical end 69 axially opposite each other (FIG. 12).

The ends 68, 69 are arranged on the side of the body 35 and on the side opposite the body 35, respectively, relative to an axial direction.

The pins 60 are hollow and house therein part of the respective springs 61.

The springs 61 pass through the respective pins 60 and are each axially interposed between a ring 53 of the rotor 25 fixed to the segment 73 and the end 69 of the pin 60.

With reference to FIGS. 9 to 11, 13 and 14, the body 80 is tubular and defines the profiles 62.

In greater detail, the body 80 has a predominantly axial extension.

The body 80, in turn, comprises:
a pair of circumferential grooves 81 defining respective profiles 62, which are axially open on the side of the body 35 and axially closed on the side opposite the body 35 (FIG. 13);
a pair of walls 82 shaped as equally sized arcs symmetrically arranged around the axis A and defining an axial end of the body 80 axially opposite the body 35 (FIG. 14); and
a ring 83 defining an axial end of the body 80 opposite the walls 82 (FIG. 15).

In particular, the ring 83 comprises an edge 86 bent axially towards the walls 82 and radially towards the axis A.

The walls 82 comprise (FIG. 14) respective radially extending driving teeth 88 extending from the corresponding walls 82 towards the axis A.

Each profile 62 extends circumferentially for a respective arc around the axis A.

Figure 13:
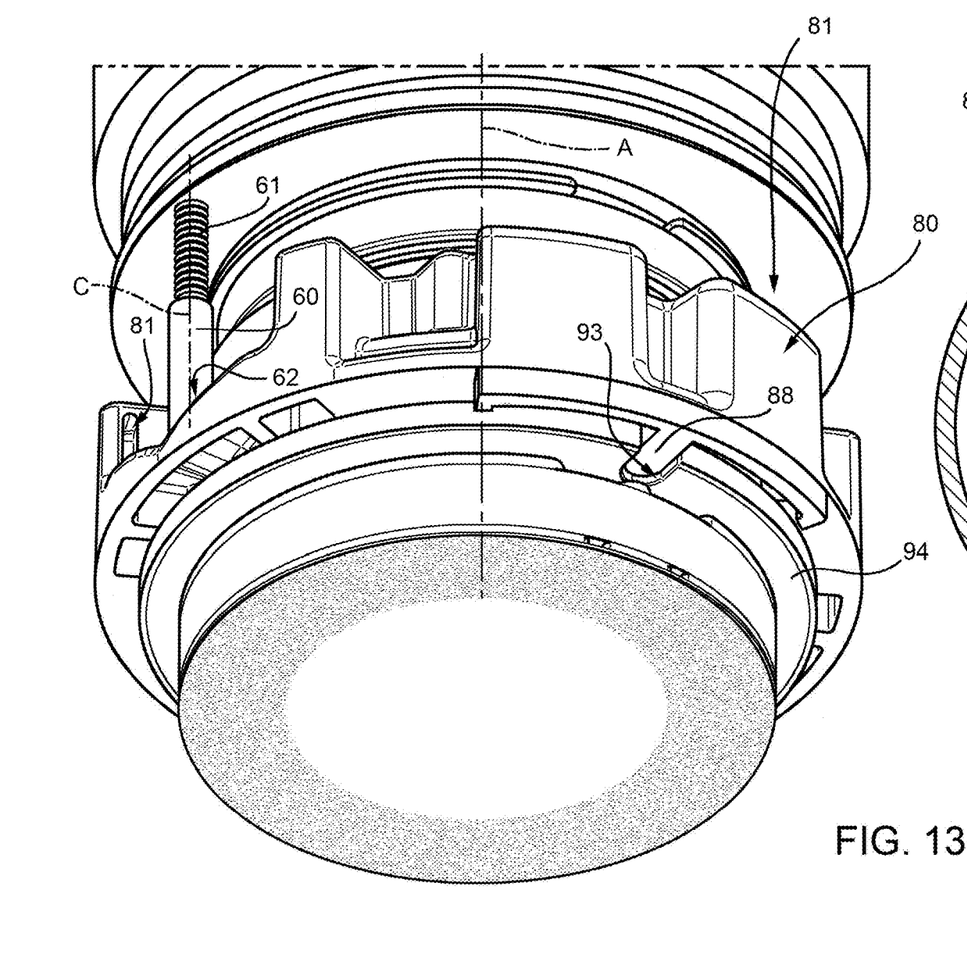
FIG. 13 is a perspective view of the control knob in FIGS. 1 to 12 on a greatly enlarged scale, with parts removed for clarity.

With particular reference to FIGS. 12 and 13, each profile 62, in turn, comprises:
a respective seat 65; and
a pair of respective segments 66 symmetrically converging into the seat 65 and extending on respective mutually opposite sides relative to the seat 65 in a direction circumferential to the seat 65.

More specifically, the segments 66 of each profile 62 have respective ends 67 opposite the seat 65 defining respective end-stroke surfaces for the respective pins 61 and consisting of respective circumferential end walls of the respective grooves 81.

The segments 66 of each profile 62 progressively approach the element 30, starting from the seat 65 towards the respective ends 67.

The pins 60 engage the seats 65 of the respective profiles 62, when the actuator 30 is arranged in the first configuration.

The pins 60 can slide on the segments 66 of the respective profiles 62, when the actuator 30 is arranged in the second configuration.

The element 80 can rotate integrally with the rotor 25 relative to the support 20, when the actuator 30 is in the first configuration.

Consequently, the torque exerted by the user upon the rotor 25 causes the pins 60 and the springs 61 to rotate integrally with the rotor 25 and the body 80 relative to the axis A.

Otherwise, the element 80 is braked by the actuator 30 in its rotation around the axis A, when the actuator 30 is arranged in the second configuration.

Consequently, the torque exerted by the user upon the rotor 25, due to the compression of the springs 61, causes the pins 60 to slide along the respective profiles 62.

The extent of the stroke C2 is determined by the extent of the sliding of the pins 60 along the respective profiles 62 until the pins 60 are in contact with one of the ends 67 of the respective profiles 62.

The knob 16 also comprises a pair of annular rolling bearings 85, 87 of axis A, axially spaced from each other and designed to support the rotor 25 in a rotary manner on the support 20 around the axis A (FIGS. 9, 10 and 11).

In greater detail, the bearing 85 is axially arranged on the side of the body 35 and the bearing 87 is axially arranged on the side of the body 54.

The bearing 85, in turn, comprises:

a radially inner ring fixed to the element 37 and the toothing 50 of the support 20, and axially locked between the toothing 50 and a tube 89; and a radially outer ring fixed to the segment 73 of the rotor 25, axially interposed between a pair of annular shoulders 91 defined by the segment 73, and rotatable relative to the radially inner ring.

The bearing 87, in turn, comprises:

an inner ring fixed to the element 37 of the support 20 and axially cooperating with the tube 89; and an outer ring axially cooperating with the edge 86 of the body 80 through the interposition of a circlip 92 (FIG. 9), and rotatable relative to the radially inner ring.

The actuator 30, in turn, comprises:

an electromagnet 90 that can be selectively supplied with a variable electric current to generate a magnetic field; and a ring 94 made of conductive material axially superimposed on the electromagnet 90, coaxial with the axis A, and selectively immersed in the magnetic field generated by the electromagnet 90.

Figure 14:
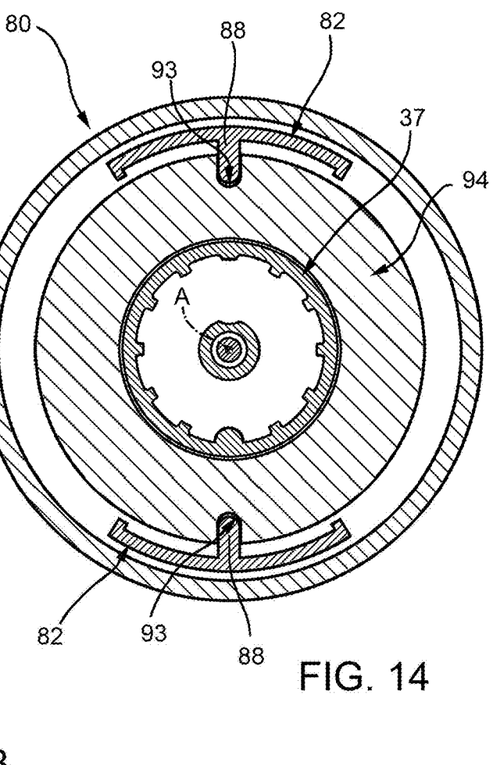
FIG. 14 is a section along the line XIV-XIV in FIG. 1.

With particular reference to FIG. 14, the ring 94 is supported rotationally around the axis A by the element 37.

The ring 94, in turn, comprises a pair of radially open seats 93 engaged by the respective teeth 88 of the body 80.

Therefore, the body 80 is also supported rotationally around the axis A by the element 37.

In greater detail, in the first configuration of the actuator 30, the electromagnet 90 is supplied with a first electric current value or is not supplied electrically. In this way, the actuator 30 substantially exerts no braking torque upon the ring 94. The ring 94 is thus free to rotate integrally with the body 80, following the rotation of the rotor 25 by the user.

In the second configuration of the actuator 30, the electromagnet 90 is supplied with a second electric current value so as to exert a braking torque upon the ring 94, thereby braking or preventing its rotation around the axis A, following the rotation of the rotor 25 by the user.

The presence of the teeth 88 engaging the seats 93 allows this braking torque to be also transmitted to the body 80.

With reference to FIGS. 9 to 11, the actuator 28, in turn, comprises:

an electric motor 100 fixed to the casing 26;

a screw 101 driven into rotation by the electric motor 100 around its own axis B, which is parallel and offset relative to the axis A; and a lead-screw 102 screwed onto the screw 101 and capable of sliding integrally with the support 20 and the rotor 25 parallel to the axis A.

In greater detail, the lead-screw 102 is housed in a seat 105 delimited radially by the crosspiece 63 of the body 54 and axially by the electromagnet 90 and by a shoulder 106 of the crosspiece 63 (FIG. 11).

The knob 26 further comprises:

a guide 107 which is fixed relative to the axis A and eccentric relative to the axis A; and a slide 103 that can slide on the guide 107, which is also eccentric relative to the axis A and fixed to the segment 64 of the body 54, so as to prevent the lead-screw 102 and the body 54 from rotating around the axis B.

The printed circuit board 33 is operatively connected to the actuators 28, 30 and the electric motor 100.

The printed circuit board 33 is configured to control the actuation of the actuators 28, 30 and of the electric motor 100, based on the commands given by the user in the areas 17a, 17b of the surface 15 and in the areas 32a, 32b, 32c, 32d of the area 31.

In greater detail, the printed circuit board 33 is housed in the casing 26.

The printed circuit board 33 is bent twice inside the casing 26 to form:

a pair of mutually parallel elements 111 lying in respective planes orthogonal to the axis A and superimposed at a distance along the axis A; and an element 112 lying in a plane parallel to the axis A and arranged orthogonally to the elements 111.

In greater detail, the stroke C2 is greater than the strokes C1 that are identical to each other.

The pins 60 and the springs 61 extend along respective axes C parallel to the axis A and are angularly equally spaced around the axis A.

The knob 16 further comprises an annular guide 110 (FIGS. 9 to 11) radially interposed between the rotor 25 and the casing 26 and designed to allow the rotor 25 to slide axially relative to the casing 26 during the movement of the assembly 27 between the lifted and lowered positions.

With reference to FIG. 15, the control unit 7 is programmed to receive, as an input, the configuration of the actuator 30 and the position of the rotor 25 from the printed circuit board 33 and to generate a command signal for the actuators of the systems 4, 5.

In particular, the control unit 7 is programmed to control the actuators of the systems 4 to increase (decrease) the temperature and the air flow rate within the respective area 8, 9 when the actuator 30 of the related knob 16 is in the first configuration and until the sensors of the systems 4 detect that the temperature has reached a value associated with the number of clockwise (anti-clockwise) snaps completed by the rotor 25.

The control unit 7 controls the actuators of the systems 5 to increase (decrease) the inflation pressure of the seats 3 when the actuator 30 of the related knob 16 is in the second configuration and a torque is exerted upon the rotor 25 in a clockwise (anti-clockwise) direction.

The control unit 7 is also programmed to display on the area 31 the temperature values inside the passenger compartment 2 and an image associated with the value of the refreshing/cooling air flow rate generated by the system 4.

In other words, the area 31 defines a display designed to display parameters that are meaningful for the operation of the systems 4, 5.

The operation of the knob 16 is illustrated below from a condition in which the user intends to adjust the system 4.

In this condition, the assembly 27 is in the lowered position and the actuator 30 is arranged in the first configuration, in which the electromagnet 90 is supplied with the first electric current value or is not supplied electrically. Therefore, the ring 94 is not subjected to any braking torque.

The user selects the setting of the system 4 by touching the area 17a of the interface 16 or of the area 32a of the area 31.

At this point, the user adjusts the system 4 by exerting a torque upon the rotor 25 via the concavity 71.

The rotation of the rotor 25 in relation to the support 20 around the axis A causes the sequential interaction of the springs 49 with the teeth 51 of the toothing 50.

During this sequential interaction, the user perceives the first tactile sensation formed by a plurality of consecutive snaps having a stroke C1. Each of these snaps is caused by the interaction of the springs 49 with a respective pair of teeth 51 of the toothing 50.

Importantly, during the rotation of the rotor 25 in relation to the support 20, the pins 60, the springs 61, the profiles 62, and the body 80 rotate as a single body together with the rotor 25.

In particular, the pins 60 housed in the respective seats 65 drive the body 80 into rotation.

The body 80 drives the anchor 91 into rotation, through the interaction of the teeth 88 with the respective seats 93.

The user stops acting on the rotor 25 once the desired setting position of the system 4 is reached.

The user selects the setting of the system 5 by touching the area 17b of the interface 16 or of the area 32b of the area 31.

As a result of this action, the printed circuit board 33 supplies the electromagnet 90 with the second electric current value.

Consequently, the electromagnet 90 exerts a braking torque upon the ring 94 and, therefore, on the body 80 due to the interaction between the teeth 88 and respective seats 93, and prevents or at least brakes its rotation around the axis A.

The torque exerted by the user upon the rotor 25 is therefore counteracted by the aforementioned braking torque and causes the axial compression of the springs 61 and the consequent rise of the pins 60 on the respective profiles 62.

Consequently, the user perceives the second tactile sensation formed by a single snap having a duration C2 greater than the duration C1.

In the event that the user touches the area 32a, the printed circuit board 33 activates the electric motor 100, which drives the screw 101 into rotation around the axis B. The rotation of the screw 101 around the axis B only results in the translation of the lead-screw 102 parallel to the axis B relative to the casing 26. This is because the body 54 fixed to the guide 103 prevents the lead-screw 102 from rotating.

The translation of the lead-screw 102, in turn, causes the corresponding translation of the body 54 and the rod 55 and, therefore, of the entire support 20 parallel to the axis A relative to the casing 26.

This translation of the support 20 results in a corresponding translation:
of the bearing 85 and, therefore, of the rotor 25 itself; and
of the bearing 87 and, therefore, of the body 80.

Once the assembly 27 has reached the fully lifted position, the printed circuit board 33 stops the electric motor 110.

In the event that the user touches the area 32a again, the printed circuit board 33 actuates the electric motor 100 to move the assembly 27 into the lowered position.

The advantages enabled by the knob 16 according to the present invention will be apparent from an examination thereof.

In greater detail, when the actuator 30 is arranged in the first configuration following a command given by the user via the areas 17a, 32b, 32c, the rotor 25 rotates around the axis A in relation to the support 20. In this way, the springs 49 interact with the teeth 51 in a plurality of mutually consecutive positions, thereby generating the first tactile sensation formed by the respective snaps having the stroke C1.

Otherwise, when the actuator 30 is arranged in the second configuration following a command given by the user via the areas 17b, 32d, the body 80 is braked by the ring 94 of the electromagnet 90. Consequently, the torque exerted by the user upon the rotor 25 causes the compression of the springs 61 and the sliding of the pins 60 on the respective profiles 62. This creates the second tactile sensation with a single snap having a stroke C2.

The knob 16 thus allows both the closed-loop adjustment system 4 and the open-loop adjustment system 5 to be adjusted with a single body, providing the user with respective tactile sensations which are different from each other.

This reduces the overall size of the knob 16 and the impact on the layout of the passenger compartment 1, while reducing the risk of distraction for the user due to the different tactile sensations generated by the knob 16.

The area 31 defines a display which displays to the user in a simple way the different functions of the systems 4, 5 designed to manage the comfort of the motor vehicle 1.

The assembly 27 consisting of the rotor 25 and the support 20 can selectively slide parallel to the axis A between the lowered position, where it is "level" with the surface 15 of the interface 6 so as not to change the design of the passenger compartment 2, and the lifted position, where the areas 17a, 17b, 32a, 32b are easily accessible to the user.

The printed circuit board 33 is bent twice inside the casing 26, so as to further reduce the encumbrance of the knob 16.

The printed circuit board 33 also incorporates the elements 111, 112, thus resulting particularly reliable due to the lack of interconnections between separate printed circuit boards.

Lastly, it is clear that modifications and variations may be made to the knob 16 manufactured according to the present invention, without however departing from the scope of protection defined by the claims.

The invention claimed is:

1. A control knob (16) for a motor vehicle (1), comprising:
a rotor (25), which can be grabbed by a user and is designed to receive a command to rotate around an axis (A); and
a support body (20) fixed relative to said axis (A) and designed to support said rotor (25) in a rotary manner around said axis (A);
characterized by comprising:
a member (80) interacting with said rotor (25) and supported by said support body (20) in a rotary manner around said axis (A);
an actuator (30) selectively movable between a first configuration, in which it allows said member (80) and said rotor (25) to rotate in an integral manner relative to said support body (20) around said axis (A), and a second configuration, in which it exerts, in use, a braking torque upon said member (80), so as to allow a relative rotation between said rotor (25) and said member (80);

a first element (49) coupled to one (25) of said rotor and support body (25, 20); and a second element (50, 51) carried by or coupled to the other one (20) of said rotor and support body (25, 20);

said first element (49) and second element (50, 51) sequentially interacting with one another, in a snapping manner, in a plurality of consecutive positions, when said actuator (30) is arranged in said first configuration, so as to provide said user with a first touch-related feedback formed by a sequence of snaps, each having a first stroke (C1);

said knob (16) further comprising:

at least one third element (60);

at least one profile (62) carried by said member (80) and extending crosswise to said third element (60); and at least one fourth elastic element (61) designed to elastically connect at least one (60) of said third element and said profile (60, 62) to said rotor (25);

said third element, said fourth elastic element and said profile (60, 61, 62) being capable of rotating around said axis (A) together with one another in an integral manner and together with said rotor (25) and with said member (80) in an integral manner, when said first actuator (30) is arranged in said first configuration;

said third element (60) being capable of sliding on said profile (62) so as to provide said user with one single second touch-related feedback of the continuous type and having a second stroke (C2), when said first actuator (30) is arranged in said second configuration.

2. The knob according to claim 1, characterized by the fact that said second stroke (C2) is greater than said first stroke (C1).

3. The knob according to claim 1, characterized by the fact that said first element (49) is a spring (49) and said second element (50, 51) is a toothing (50) with a plurality of teeth (51) sequentially interacting with said spring (49);

said spring (49) being interposed between said rotor (25) and said toothing (50).

4. The knob according to claim 3, characterized by the fact that said spring is a leaf spring having a length transversal to said axis (A) and lying in a plane parallel to said axis (A);

said toothing (50) comprising at least a plurality of teeth (51) angularly equally spaced apart around said axis (A).

5. The knob according to claim 1, characterized by the fact that:

said third element (60) is a pin elongated along said axis (A);

said fourth elastic element (61) is interposed between said third element (60) and a first ring (45) carried by said rotor (25);

said profile (62) extending circumferentially to said axis (A);

said profile (62) comprising, in turn:

a seat (65); and a pair of segments (66) converging towards said seat (65) and extending from respective opposite sides of said seat (65) circumferentially to said axis (A) and at progressively decreasing distances from said first ring (45), starting from said seat (65) towards respective free ends (67) of said segments (66);

said pin (60) engaging said seat (62), when said first actuator (30) is arranged in said first configuration;

said pin (60) being capable of sliding on one of said segments (66) of the respective profile (62), when said first actuator (30) is arranged in said second configuration.

6. The knob according to claim 5, characterized by the fact that said first actuator (30) comprises:

an electromagnet (90), which is carried by said support body (20) and can selectively be supplied with a first electric current value in said first configuration of said actuator (30) or with a second electric current value, which is greater than said first value, in said second configuration of said actuator (30) so as to generate a magnetic field; and a second ring (94) carried by said support body (20) in a rotary manner around said axis (A) and integral, in its rotation, with said member (80) around said axis (A);

said second ring (94) being free, in its rotation, around said axis (A), when said first actuator (30) is arranged in said first configuration;

said second ring (94) being immersed, in use, in said magnetic field and subjected to said braking torque, when said first actuator (30) is arranged in said second configuration.

7. The knob according to claim 6, characterized by the fact that said member (80) is tubular and comprises:

a pair of circumferential grooves (81) defining respective profiles (62);

a second ring (82), one (82) of said first ring (94) and second ring (82) carrying at least one tooth (88) engaging a corresponding seat (93) carried by the other one (94) of said first ring (94) and second ring (82);

said grooves (81) being axially open on the side axially opposite said second ring (82).

8. The knob according to claim 1, characterized by comprising a casing (26), and by the fact that said rotor (25) and said body (20) form an assembly (27), which can slide relative to said casing (26) parallel to said axis (A); said knob (16) comprising a second actuator (100), which can selectively be operated in order to move said assembly (27) parallel to said axis (A) relative to said casing (26) between:

an extracted position, in which said assembly (27) is arranged at a first distance from said casing (26) along said axis (A); and a retracted position, in which said assembly (27) is arranged at a second distance, which is smaller than said first distance, from said casing (26) along said axis (A).

9. The knob according to claim 8, characterized by comprising:

a surface (31) carried by said body (20) and designed to receive a first command or a second command or a third command in the form of a touch-related impulse; and a printed circuit board (33) bent twice inside said casing (26);

said printed circuit board (33) being configured to receive, as an input, said first or second command;

said printed circuit board (33) being further programmed to place said first actuator (30) in said first configuration following said first command and to place said first actuator (30) in said second configuration following said second command;

said printed circuit board (33) being further programmed to place said assembly (27) in said extracted position following said third command.

10. A motor vehicle comprising:
a first system (4) adjustable in a plurality of positions according to a closed-loop control logic;
a second system (5) adjustable according to an open-loop control logic;
a knob (16) according to claim 1 and designed to adjust said first system (4) and said second system (5) and to receive, as an input, said first command defining a first adjustment of said first system (4) and said second command defining a second adjustment of said second system (5); and
a control unit (7) programmed to receive, as an input, said first or second signal and to place said first actuator (30) in the first configuration, when it receives, as an input, said first signal, and to place said actuator (30) in said second configuration, when it receives, as an input, said second signal.

11. The motor vehicle according to claim 10, characterized by the fact that said surface (31) defines a display designed to display parameters that are meaningful for the operation of said first or second system (4, 5).

* * * * *